G. B. ROBERTSON.
STAKE.
APPLICATION FILED DEC. 14, 1920.

1,381,746.

Patented June 14, 1921.

WITNESSES

INVENTOR
G. B. ROBERTSON
BY
ATTORNEYS

UNITED STATES PATENT OFFICE.

GEORGE BRYANT ROBERTSON, OF KEENE, NEW HAMPSHIRE.

STAKE.

1,381,746.  Specification of Letters Patent.  Patented June 14, 1921.

Application filed December 14, 1920. Serial No. 430,741.

*To all whom it may concern:*

Be it known that I, GEORGE B. ROBERTSON, a citizen of the United States, and resident of Keene, in the county of Cheshire and State of New Hampshire, have invented a new and Improved Stake, of which the following is a full, clear, and exact description.

With regard to stakes, and more particularly such stakes which serve to retain a load properly upon a vehicle, it is well understood that considerable difficulty has been experienced incident to the non-adaptability of this device.

Thus upon a load being positioned upon a vehicle, which load failed to extend over the entire width of the beam, the stakes would not prevent the same from shifting, which often resulted in damage to both the load and the vehicle.

With this in mind, I have constructed a stake more particularly adapted for association with the body of a vehicle, and which shall primarily present an improved feature over devices of this class heretofore placed upon the market, in that the same shall be adjustable within certain limits, thus permitting of a retaining of the load in a very secure manner upon the vehicle.

A further object of my invention is that of providing a stake which shall extend in such a manner as to more firmly engage the load and prevent any accidental displacement thereof from the body of the vehicle.

Further objects of my invention will appear in the annexed specification and drawings, which latter present one practical embodiment of my invention, and in which—

Figure 1:
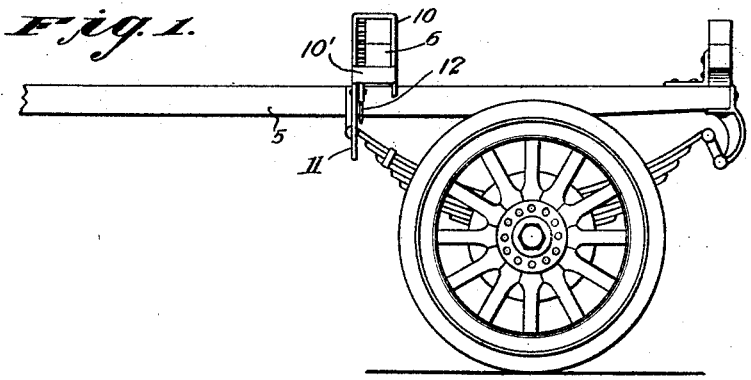
Figure 1 is a fragmentary side view of a vehicle body having my improved stake associated therewith.
Figure 2:
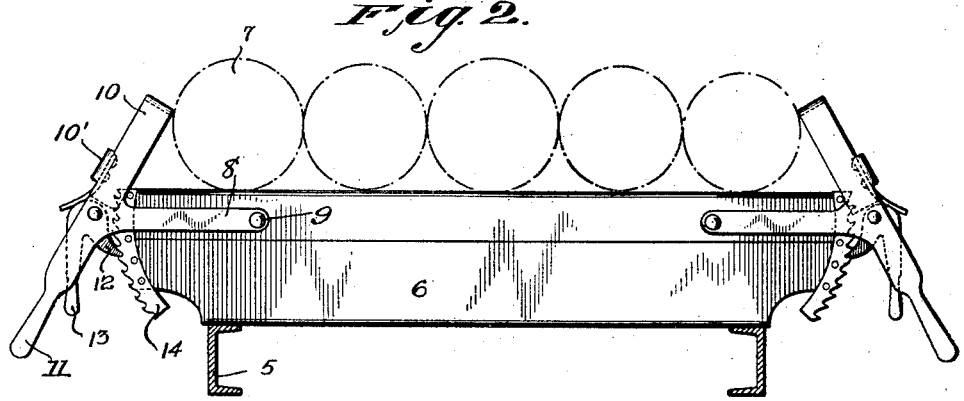
Fig. 2 is a sectional end view thereof.

In these views the reference numeral 5 indicates the frame of a vehicle which may mount a beam 6 of any desired character serving to support a load 7, disposed thereon, and having associated with it my improved type of stake.

Figure 3:
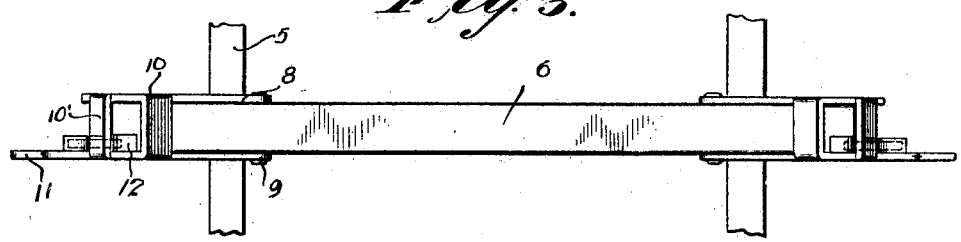
Fig. 3 is a plan view of the device as illustrated in Figs. 1 and 2.

Reference being had now more particularly to Fig. 3, it will be seen that my improved type of stake conveniently includes a pair of arms 8, which have their outer ends pivotally secured, as at 9, to the opposite side faces of the beam 6. Each of the stakes also includes a U-shaped portion 10, the arms of which are integral with, or otherwise connected to the inner ends of the arms 8, and may be suitably braced as at 10'.

It will also be noted that one of the arms of the member 10 may be extended, as has been indicated by the reference numeral 11, to provide an operating handle permitting of the stake being swung around its points of pivotal connection 9.

With a view of providing suitable means serving to retain the parts described in the preceding paragraph in their proper positions, I conveniently utilize a spring pressed pawl 12, pivotally secured between the inner ends of the arms 8 and capable of being rocked around this point of pivotal attachment by any suitable means, such as a handle 13. A ratchet 14 may be conveniently affixed to the ends of the beam 6, and such ratchet is in the form of an arc of a circle, the center of which corresponds to the point of pivotal connection 9. Thus it will be obvious that a coöperation between the pawl 12 and ratchet 14 will be permitted and that any downward swinging on the part of the U shaped portion 10 and arms 8, subsequent to their having been adjusted to their proper height, is precluded incident to the engagement existent between the pawl 12 and ratchet 14.

From the foregoing it will be seen that I have provided an improved type of stake and what might be termed a hinged-stake, which is particularly adapted for use in connection with vehicles, but not necessarily limited to this adaptation. And it will be noted in this connection that the U shaped portion 10 extends at an angle to the arms 8, which angle is less than a right angle for which reason the movement of the end portion of the stake will be upward and inward to a pronounced extent. By reason of this, a proper engagement will be provided, which will serve not alone to permit of intimate contact between the stake and the load, to prevent a shifting of the latter, but will serve to retain the load from moving from the body of the vehicle, even under the most trying conditions.

Obviously numerous modifications of structure might readily be resorted to without in the least departing from the spirit of my invention, which I claim as;

1. A stake including a pair of arms adapted to have their outer ends pivotally attached to a supporting element, a U shaped member secured to the outer ends of each of said arms and having one of its arms extending beyond the same to provide a handle, and means secured to said U shaped portion and coöperating with said supporting element to retain said arms in an angular position.

2. A stake including a pair of arms adapted to have their outer ends pivotally attached to a supporting element, a U shaped member secured to the outer ends of each of said arms and having one of its arms extending beyond the same to provide a handle, a pawl secured to said U shaped member and a ratchet adapted to coöperate with said pawl and being secured to said supporting element.

3. A stake including a pair of arms adapted to have their outer ends pivotally attached to a supporting element, a U shaped member secured to the outer ends of each of said arms and having one of its arms extending beyond the same to provide a handle, a pawl secured to said U shaped member and a ratchet adapted to coöperate with said pawl and being secured to said supporting element said ratchet being in the form of an arc of a circle having as its center the points of pivotal mounting of said arms.

GEORGE BRYANT ROBERTSON.